United States Patent Office

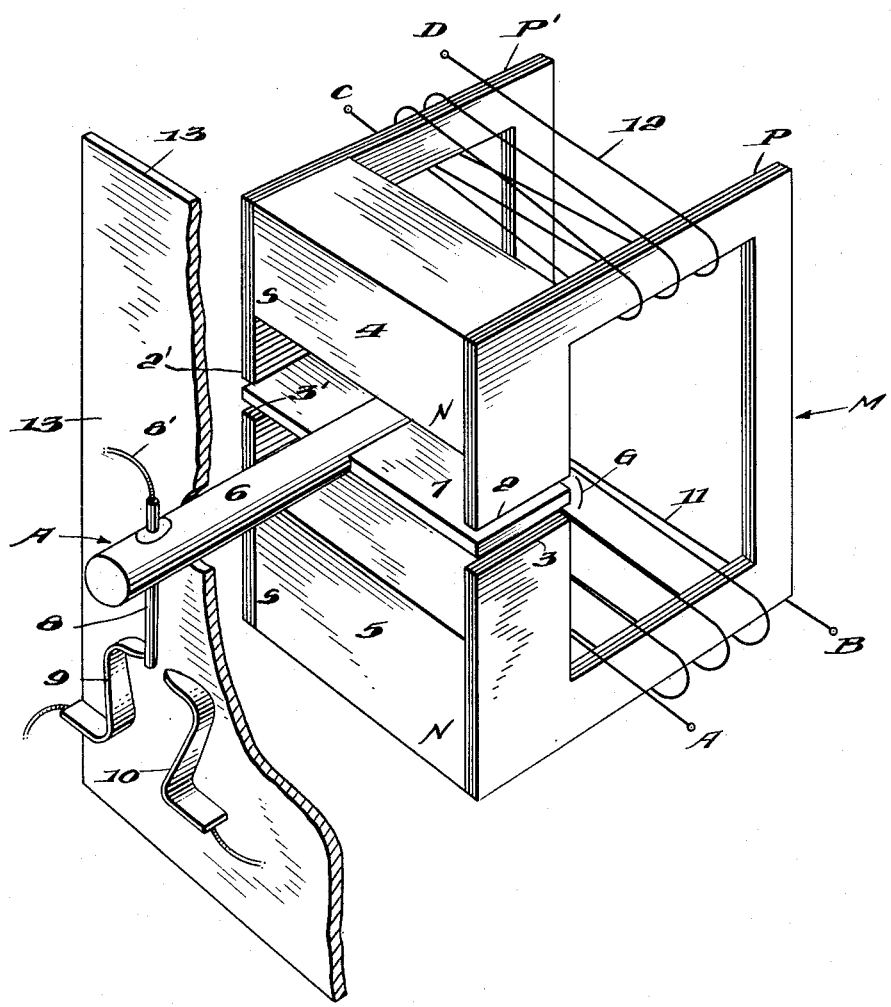

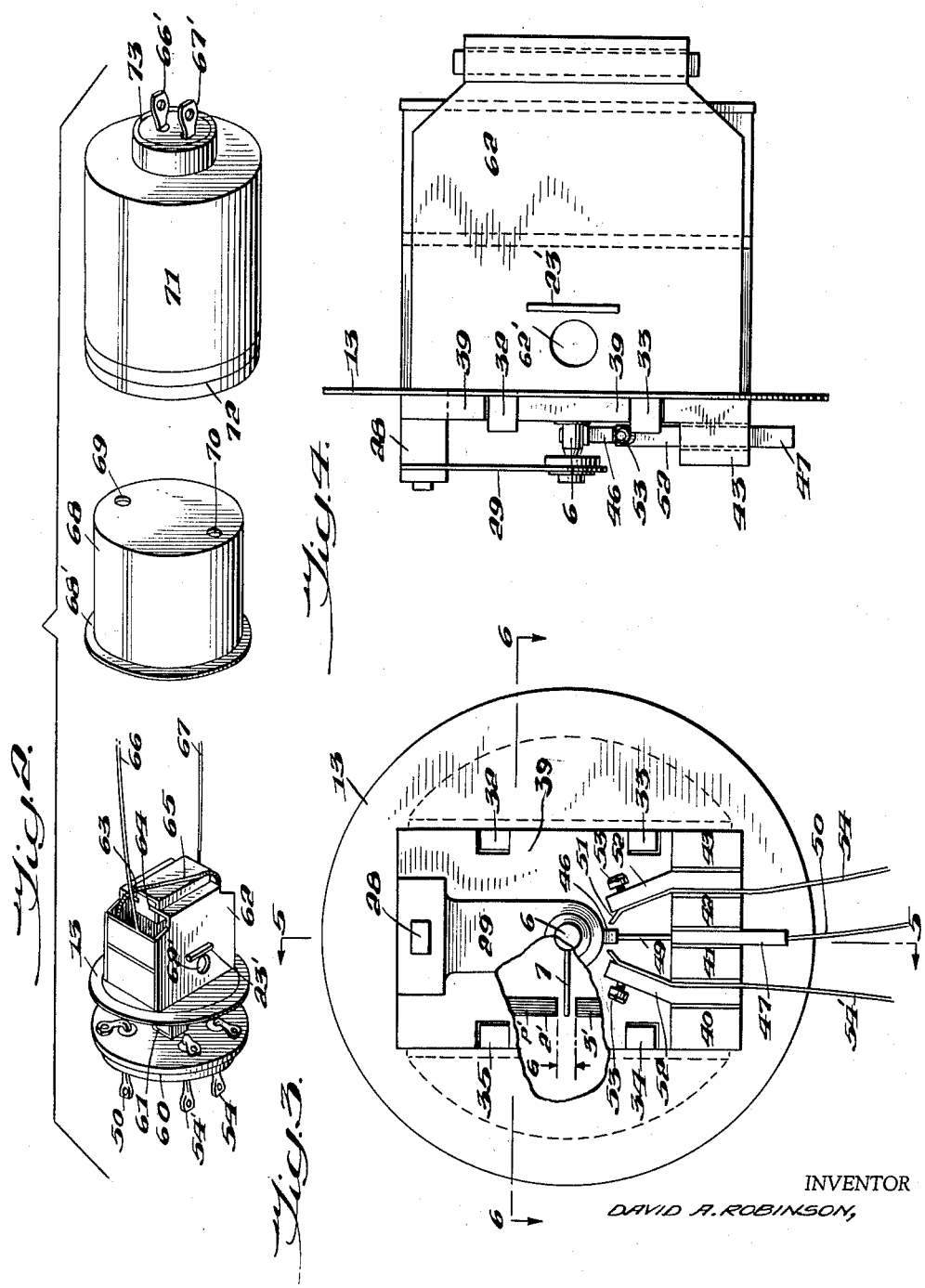

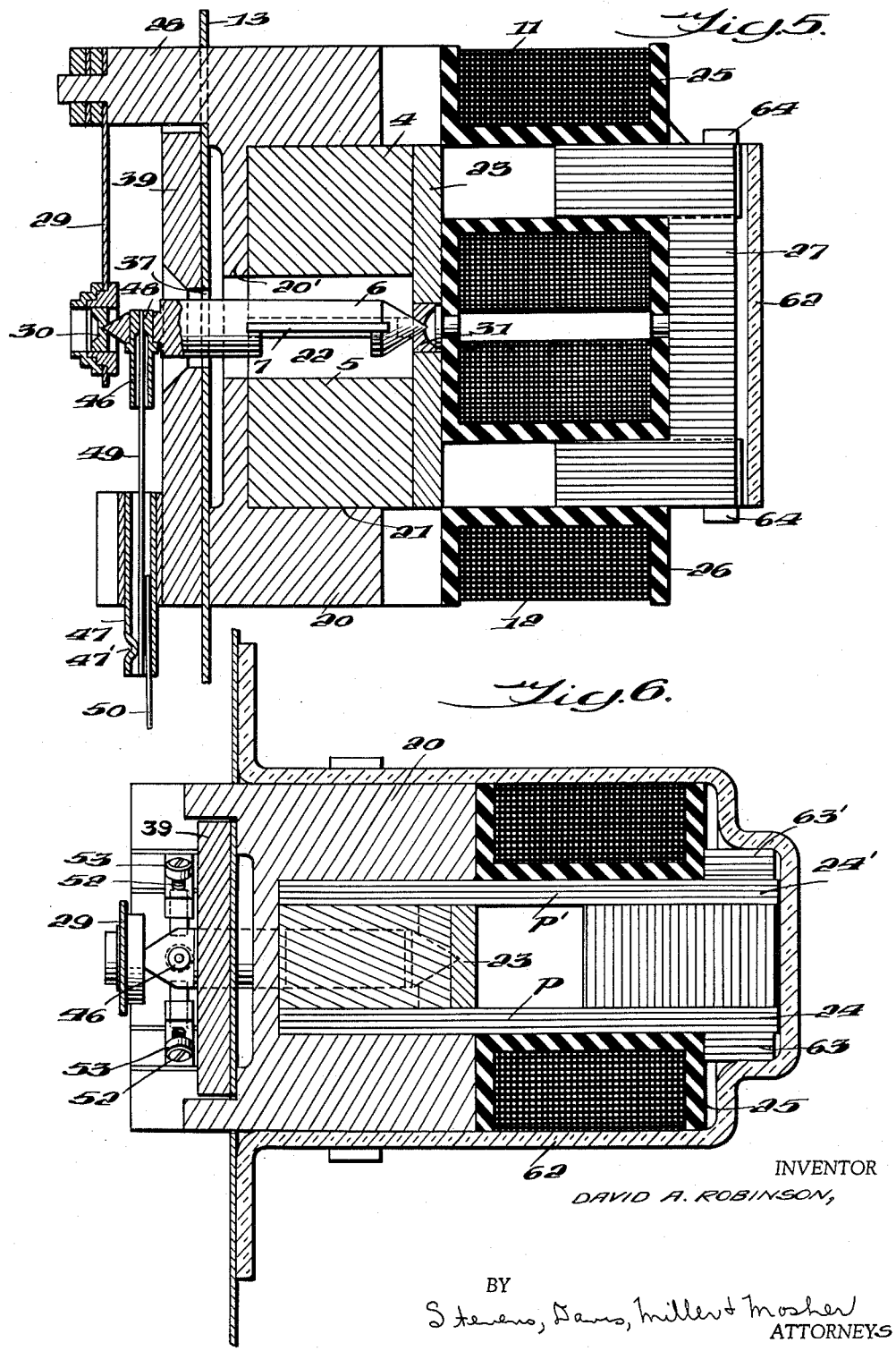

3,115,562
Patented Dec. 24, 1963

3,115,562
ELECTROMECHANICAL CHOPPER
David A. Robinson, Fort Lauderdale, Fla., assignor to Airpax Electronics Incorporated, Fort Lauderdale, Fla., a corporation of Maryland
Filed Oct. 21, 1960, Ser. No. 64,023
11 Claims. (Cl. 200—90)

This invention relates to an electromechanical chopper and more particularly, due to its construction, a highly efficient low noise type of electrical current chopper. Due to a novel mechanical arrangement of coils, magnets and contacts, that together function as a chopper or contact modulator, the device is capable of operating over a wide range of frequencies, as for example, 0 to 2,000 cycles per second, the output of which has exceptionally low noise characteristics.

It is an object of this invention to provide an electromechanical chopper which is driven by two magnetic coils modulating a permanent magnet field and inasmuch as it does not contain springs, the device is non-resonant; hence, it will effectively operate over a wide range of frequencies such as from 0 to 2,000 cycles, or higher, per second.

Another object of this invention is to provide an electromechanical chopper which has an extremely low noise level due to its mechanical construction in which the permanent and alternating magnetic fields are shielded from the portions of the device wherein the chopping of a D.C. current takes place so that there will be no noise or spurious voltages introduced by reason of stray magnetic fields.

Another object of the invention is the construction of an electromechanical chopper in which there are very tight or well defined magnetic paths to prevent flux leakage into the chopping contact area, and to increase the available driving torque for a given number of ampere turns in the coil.

Another object of the invention is to provide an electromechanical chopper whose moving element is dynamically pivoted on a line passing through or near its center of gravity thereby allowing the chopper to operate in a manner independent of external vibrations and accelerations.

Further and other objects will become apparent from the description of the accompanying drawings in which like numerals refer to like parts.

In the drawings,

FIGURE 1 is a schematic representation of the principal electromechanical components of a chopper in accordance with this invention.

FIGURE 2 is an exploded view showing the chopper unit with the shield and the casing member removed.

FIGURE 3 is a front elevation of the chopper unit.

FIGURE 4 is a side elevation of the chopper unit.

FIGURE 5 is a section taken on the line 5—5 of FIGURE 3.

FIGURE 6 is a section taken on line 6—6 of FIGURE 3.

The electromechanical chopping device of this invention is fully illustrated in FIGURES 2 to 6 but for purposes of setting forth the essential elements to demonstrate the operation, FIGURE 1 has been included which is a schematic, functional drawing for purposes of explaining the operation of the device.

In FIGURE 1 there is shown an electromagnet M having core elements P and P'. End portions of each of the laminated structures P and P' constitute pole shoes 2, 3 and 2', 3', respectively, between which is an air gap G. Two such laminated structures are spaced apart by two permanent bar magnets 4 and 5, each bar magnet engaging each laminated structure in the area of the pole shoes. The bar magnets 4 and 5 are positioned in bucking relationship wherein the two north poles N, N of the bar magnets engage one laminated structure P and the two south poles S, S of the bar magnets engage the other laminated structure P'. An armature assembly A is provided which has an armature shaft 6 mounted in a manner (not shown in this functional diagram) to oscillate freely about its longitudinal axis. A vane extends symmetrically on each side of the armature shaft to provide an armature flapper 7. The dimensions of the outer ends of the armature or vane 7 are such that it extends substantially the same width as the pole shoes and divides the air gaps into two air gaps. The vane in effect divides each of the two air gaps G between the two sets of pole shoes 2, 3 and 2', 3' into two smaller substantially equal air gaps. On the shaft 6, remote from the magnet structure, is rigidly mounted an insulated contact member 8 which moves with or oscillates with any oscillatory motion of the armature shaft. Mounted adjacent the armature shaft contact member 8 are two oppositely spaced stationary contacts 9 and 10 that will be contacted by the armature contact 8 as the shaft is oscillated a few degrees from its neutral or mid-position. Two driving coils 11 and 12 are mounted on the laminated structure as shown in the diagrammatic representation, one coil 11 having terminals A and B and the other coil 12 having terminals C and D. The two driving coils 11 and 12 may be connected in parallel or series and when an A.C. current is passed through the coils the flux generated in the coils modulates the flux across the air gaps between the vane 7 and pole shoes, the vane acting as a return path in the magnetic circuit of both bar magnets. As the coils 11 and 12 send alternating flux through the laminated structures or laminated magnetic circuits across the two smaller air gaps within each gap G and passing through the flapper armature 7, the flux from the coils 11 and 12 will aid the permanent magnet field in one alternate pair of smaller air gaps of opposite gaps G and oppose it in the other alternate pair of smaller air gaps in such a way as to apply alternate torques to the armature shaft 6. The shaft 6 will rotate in a given direction until the contact 8 carried thereby touches one of the stationary contacts 9, 10 which restrains further rotation in that direction and prevents the ends of the armature from striking the pole shoes. When the flux in the air gaps G reverses the effect on the permanent magnet flux, due to alternation of the current in the driving coils, it reverses the rotation of the armature 7 and contact 8 carried by the armature will contact the other of the stationary contacts 9, 10. Thus, it will be seen that an alternating current of any frequency in the driving coils 11, 12 causes the moving contact 8 to move back and forth at the same frequency as the alternating current impressed on the driving coils 11 and 12. Since the motion of the moving contact is non-resonant, inasmuch as there are no springs in this system, the oscillation of the armature 7 can be effected over an extremely wide range of frequency. If a D.C. current is fed at 8' into the moving contact 8 mounted on the armature shaft 6, the circuit with the two stationary contacts 9 and 10 will be alternately made and broken. Thus, when the two stationary contacts are connected to a suitable circuit, which includes movable contact 8, a "chopped" D.C. current will be achieved.

Because of the high flux density generated by the alternating field of the driving coils 11 and 12, a shielding metal plate 13 is inserted between the magnetic system that drives the armature shaft and the make and break contacts 8, 9 and 10 of the D.C. system. The armature shaft 6 freely extends through an aperture in the metal plate. The metal plate 13 is of a magnetic material such as soft iron or Mu Metal. By being placed between and spaced from both the contact and the magnetic circuit areas a distance greater than the air gap between the pole shoes ensures that the metal shield plate will not only prevent the permanent magnet circuit from being shorted out but it will also prevent stray magnetic fields from extending into the contact area and ensure tight coupling of the magnetic circuit.

Referring to FIGURES 2 to 6 which disclose an actual structural embodiment of the electromechanical chopping device, that in actual use is an extremely small unit, "micro" in size, a rigid rectangular frame 20 is shown (FIGURES 5 and 6) having an apertured wall 20', forming with the outer peripheral wall, a central rectangular space 21 within which are disposed laminated magnet pole structures P and P' spaced laterally from each other by permanent bar magnets 4 and 5. The dimensions of the permanent bar magnets are such as to provide a space 22 therebetween. The laminated pole structures P and P' each comprise oppositely, inverted L-shaped members having their forward portions engaging frame wall 20' and spaced apart at their adjacent inner ends to form a gap G. These adjacent inner ends of the pole structures P and P' form pole shoes 2, 3 and 2', 3' for the permanent bar magnets 4 and 5 which tightly contact the pole structures adjacent the pole shoes 2, 3 and 2', 3'. At the rearward ends of the horizontally extending portions 24 and 24' of the pole members P and P' are transversely extending laminated members 63 and 63' disposed in intimate contact with each respective pole portion 24 and 24' to effectively complete the flux path of each of the pole structures. The permanent bar magnets 4 and 5 are arranged in flux bucking position with respect to each other, that is, both north poles N and N of the bar magnets engage one laminated structure P while both south poles S and S of the magnets engage the other laminated structure P'.

A back plate 23 of cruciform shape is mounted on and closes the back of frame 20. Plate 23 bears against bar magnets 4 and 5 and is interpositioned between the spaced portions of the laminated structures P and P', the ends of the backing plate 23 dovetailing snugly into suitable mounting depressions on the back face of frame 20. Mounted on the respective extending ends 24 and 24' of the laminated structures P and P' are bobbins 25 and 26, formed of nylon, for example, carrying the electrical coils 11 and 12. A C-shaped ceramic spacer block 27 is snugly positioned between the rear portions of the portions 24, 24' of the laminated pole structures P and P' within the coil bobbins, as shown in FIGURES 5 and 6, to rigidly secure the laminated structures within space 21 of the frame 20 and separate their back portions from each other. Spacer 27 also functions to rigidly position the coil bobbins on the pole members P and P' and to rigidify the structure as a whole.

From the central upper portion of the front face of frame 20 extends a lug 28 on which is suitably secured a depending arm structure 29 at the lower end of which is suitably mounted a jewel bearing 30 coaxially of the device. In alignment with bearing 30 is provided a corresponding bearing 31 in backing plate 23. Mounted on frame 20 in proximity to frame wall 20', by means of bearing support lug 28 and positioning lugs 32–35, is a centrally apertured flux shielding metal plate 13 of soft iron or Mu Metal of high permeability. Plate 13 is fixedly held in position with its central aperture 37 in alignment with the armature shaft bearings 30, 31. Also fixedly mounted on the same positioning lugs 32–35 of frame 20 and in contact with plate 13 is a relatively heavy front plate 39 with a central aperture registering with aperture 37 and having spaced stationary electrical contact mounting lugs 40, 41, 42 and 43 disposed adjacent its lower end on its face remote from the permanent magnets 4 and 5.

Bearings 31 and 32 freely rotatably mount an armature shaft 6 of nonmagnetic material on or through which is symmetrically mounted a relatively thin, lightweight flapper armature 7 of magnetic material and low inertia and of constant rectangular cross section and having a width the same as that of the pole shoes 2, 3 and 2', 3' of the pole structures and having its ends disposed in the respective gaps G between the pole shoes.

Rigidly secured in and extending diametrically through and to a position below armature shaft 6 and intermediate front shaft bearing 30 and front plate 39 is a tubular reed member 46 constituting a movable contact which extends normal to the plane of the flapper armature 7. Directly below and spaced from reed contact member 46 is fixedly mounted a tubular connector member 47 on front plate 39 in the slot formed by lugs 41 and 42 but insulated therefrom. Securely attached at 48 within the upper end of tubular reed contact member 46 is a reed-wire 49 which extends down into the tubular connector 47 and is secured therein by crimping at 47' or by any other suitable method. The connector 47 has a terminal wire 50 also secured therein, for example by the crimping 47', the wire extending outwardly from the lower end of the tubular connector. Thus, reed-wire 49 electrically and flexibly connects the moving contact 46 to terminal wire 50.

Stationary contact assemblies are rigidly and insulatedly mounted in each of the slots formed by lugs 40, 41 and 42, 43 at each side of connector 47 on front plate 39 and disposed within the same plane normal to the armature shaft 6 as is tubular reed 46. Each stationary contact assembly comprises a contact member 51 and an adjacent rigid contact bar 52 having an adjusting screw 53 threadedly mounted therein to bear against the upper end of the contact member 51 to adjustably position the spacing of each stationary contact 51 relative to the movable reed contact 46. Suitable terminal wires 54 and 54' are secured to the respective contact bars 52.

A D.C. current terminal block or header 60 carrying suitable terminals connected to contact terminal wire 50, 54 and 54' is attached to a header bracket 61, as by spotwelding, and the bracket 61 being similarly attached to the front of shield plate 13. A hood 62 having an inspection aperture 62' abreast the ends of the armature 7 surrounds the magnet, armature and contact assembly, it being positioned by tabs 23' on back plate 23, and is likewise spotwelded to the back of shield plate 13 with the connector 65 for the leads of the coils 11 and 12 disposed exteriorly of the hood, as shown in FIGURE 2. Rear laminations 63, 63' of the pole members fill the spaces formed rearwardly of the coil bobbins 25, 26 and between spaced pole laminations 24, 24' and the hood structure 62, the laminations 63, 63' being secured in position by bent-over tabs 64 on the hood. A flux shielding intermediate cover 68 of Mu Metal, having apertures 69, 70 in its rearward end, is telescoped over hood 62 and spotwelded onto plate 13 by means of flange 68' with the A.C. lead in terminal wires 66 and 67 for coils 11 and 12 extending through cover apertures 69 and 70, respectively. An outer casing 71 having a beading 72 at its open end encloses the entire assembly, the beading 72, in conjunction with a hermetic seal (not shown), sealing, engaging and securely mounting casing 71 on the periphery of header 60. The opposite end of casing 71 has a terminal structure 73 through which the terminals 66' and 67' of the leads 66 and 67 of the A.C. coils 11 and 12 extend in hermetically sealed relationship. By having the A.C. current terminals extend out of the back end of the assembly, remote from the D.C. current terminals extending from the opposite or front end of the unit, it is possible to minimize the stray coupling effects between the two circuits. While I have, by way of example, shown enclosure means of cylindrical configuration it is not intended that the disclosure be so limited. For instance, in order to utilize the miniature size of this chopper unit for printed circuit board use a rectangular casing that fits snugly over the body of the chopper with a miniature glass feed through header 60 may then be used which would result in a flat unit suitable for direct wiring on a printed circuit board.

In operation, assume the A.C. coil terminals 66' and 67' to have an A.C. current of a predetermined frequency F impressed thereon and the center D.C. terminal wire 50 as connected to a source of D.C. current. As the two driving A.C. coils 11 and 12 send an alternating flux through the laminated structures 24, 24', 27, 63 this alternating flux, which does not have to flow through the permanent bar magnets 4 and 5, modulates the magnetic flux obtaining across the air gaps G between each of the pole shoes 2, 3, and 2', 3', in which the ends of the flapper armature 7 are disposed. This alternating flux aids the permanent magnet field in one pair of alternate air gap spaces between the armature and pole shoes while it opposes or weakens the magnetic field that obtains across the other alternate pairs of air gap spaces in such a way as to apply alternate torques to the armature shaft 6 thus oscillating the flapper armature 7. Thus, as the armature oscillates, reed contact 46 alternately contacts the stationary contacts 51 thereby effecting momentary flows of D.C. current, that is, a chopped flow, in the D.C. circuit including contacts 46, 51 at a frequency corresponding to the frequency of the A.C. current flowing in the drive coils 11 and 12. The stationary contacts 51 also function to limit the rotation of the armature shaft 6 thus preventing the flapper armature 7 from striking pole shoes 2, 3, and 2', 3'.

This device thus effectively produces a chopped or modulated D.C. current over a wide range of frequencies, such as from 0 to 2,000 cycles per second. This is due to the extremely low inertia of its armature structure, its C.G. mounting, the very small arc of flapper armature movement, the non-resonance of the device due to the absence of any springs, and the high flux density within the small air gaps of its magnet structure which provide its tight magnetic circuits that allow only minimum flux leakage, and the fact that the A.C. flux does not have to flow through the permanent magnets. The parts that are of special magnetic or ceramic materials have been so designated. The remainder of the parts, such as plate 39, frame 20, back plate 23, the contacts, etc., are of nonmagnetic materials. Moreover, since the A.C. and D.C. terminals are disposed at each extreme end of the unit, and thus are widely separated, and by reason of its particular placement, the shielding Mu Metal plate 13 is highly effective in shielding the D.C. modulating area from stray magnetic fields from within the magnetic flux area, the chopped D.C. current at the D.C. terminals is substantially free of any noise or spurious voltages.

This electromechanical D.C. current chopper provides, by its novel construction, a high ratio of torque to movement of inertia which enables it to function in a firm manner and materially contributes to rendering it impervious to vibration and acceleration.

Having described the principles of my invention in connection with a specific embodiment thereof, it is to be clearly understood that this description is made by way of example only and not as a limitation in the scope of the invention as set forth in the accompanying claims.

What is claimed is:

1. An electromechanical chopper device comprising, a support structure, pole means having pairs of pole shoes mounted on said support structure in transversely spaced relation, permanent bar magnets disposed in bucking relation between said transversely spaced pairs of pole shoes, coil means operatively mounted relative to said pole means and adapted to be energized from an A.C. current source, an armature shaft having an armature fixed thereon, means mounting said armature shaft to freely oscillate said armature through a predetermined arc between said pairs of pole shoes of said pole means, contact means carried by said armature shaft adapted to be energized by a D.C. current source, stationary contacts contactable by said armature-shaft-carried contact means at the ends of the arcuate movement of said armature whereby a chopped D.C. current having a chopped frequency having the same frequency of the A.C. current in said coil means is obtained, said pole means comprising two laterally spaced, inverted L-shaped laminated members, each laminated member being spaced apart to form said pair of pole shoes with an air gap formed therebetween at one end thereof, additional laminated members at their opposite ends in close contact with said L-shaped members thereby completing the flux paths of the said pole members, said coil means comprising two nonmetallic bobbins each mounting a coil, each coil bobbin enclosing opposite spaced portions of said L-shaped laminated pole members, said pole means including a nonmetallic spacer member snugly engaging and positioning the opposite ends of said L-shaped laminated pole members in said support structure, a metallic flux shielding plate means fixedly mounted on said support structure and disposed in a plane normal to said armature shaft, said armature shaft extending through an aperture in said shielding plate, said shielding plate means being located between and spaced from each of the areas of the contacts and the magnetic circuit a distance greater than the air gap between the pole shoes thereby preventing the permanent magnet circuit from being shorted out and stray magnetic fields from extending into the area of the contacts.

2. An electromechanical chopper unit having a high ratio of torque to moment of inertia comprising a supporting frame structure, laterally spaced pole members mounted on said supporting frame structure, each pole member having a pair of equally spaced corresponding pole shoes forming air gaps, magnet means comprising permanent magnets mounted between said pole members adjacent said pole shoes in bucking relation to each other, energizing coils mounted on said pole members, an armature shaft rotatably mounted on its center of gravity between said pole members and having a flapper armature of thin section and low inertia disposed symmetrically and transversely to said shaft thereby rendering the structure impervious to vibration and acceleration, the ends of said flapper armature being disposed in the air gaps of said pole shoes, a movable contact member fixedly mounted on said armature shaft in spaced relation to said flapper armature, oppositely disposed contact members with respect to said movable contact stationarily mounted on said frame structure in a plane normal to said armature shaft, said energizing coils when energized causing cyclic oscillation of said armature shaft and armature thereon, the stationary contact members being contacted alternately by and limiting the oscillation of said movable contact member in noncontacting relation to said pairs of shoes, a flux shielding plate means interposed between said magnet means and the area of the contacts and extending transversely across the entire unit and normal to said armature shaft to shield the contact area from the magnetic flux area.

3. The device as recited in claim 2 wherein the flux shielding plate means is located between and spaced from each of the areas of the contacts and the magnetic circuit a distance greater than the air gap between the pole pieces thereby preventing the permanent magnet circuit from being shorted out and stray magnetic fields from extending into the area of the contacts.

4. An electromechanical chopper device having a high ratio of torque to moment of inertia comprising a support means, laterally spaced laminated pole structures having a generally C-shape configuration, each laminated pole structure including a closely spaced pole air gap forming a pair of pole shoes abreast of each other and mounted on said support means, a nonmetallic spacer member between said pole structures to space and rigidly secure said laminated structures on said support means, permanent bar magnets disposed in bucking relation between said pole structures and positioned adjacent said pairs of pole shoes, separate spaced coil means mounted on and extending around both pole structures at points intermediate the pairs of pole shoes and said nonmetallic spacer member, a relatively thin low inertia flapper armature extending between and in said pole gaps, a shaft mounting said flapper armature substantially on its center of gravity for limited rotary movement of its ends within said pole air gaps between said pole shoes, the said flapper armature ends oscillating within said air gaps in response to a source of A.C. current energizing said spaced coil means, said armature oscillation being at the same frequency as the frequency of the A.C. current in said spaced coils and independently of external vibrations and accelerations, said separate coil means being electrically connected together, a contact means securely mounted on said armature shaft, two stationarily mounted contacts each contactable by the armature-shaft-carried contact at each end of the limited rotary movement of the said armature shaft, a magnetic flux shielding plate member interposed between the contact and magnetic flux areas, the spacing of said shielding plate member between each of the two said areas being greater than the air space between the pole shoes to prevent the permanent magnet circuit from being shorted out and also shielding the contact area from the magnetic flux area.

5. The structure as defined in claim 4 wherein each stationary contact comprises a contact assembly including a rigid contact supporting bar and a contact member, said contact supporting bar and contact member being closely disposed adjacent each other, and means to independently adjust the position of each contact member relative to its said rigid supporting bar.

6. An electromechanical chopper device having a high ratio of torque to moment of inertia comprising a support means, laterally spaced laminated pole structures having a generally C-shaped configuration, each laminated pole structure including a closely spaced pole air gap forming a pair of pole shoes abreast of each other and mounted on said support means, a nonmetallic spacer member between said pole structures to space and rigidly secure said laminated structures on said support means, permanent bar magnets disposed in bucking relation between said pole structures and positioned adjacent said pairs of pole shoes, separate spaced coil means mounted on and extending around both pole structures at points intermediate the pairs of pole shoes and said nonmetallic spacer member, a relatively thin low inertia flapper armature extending between and in said pole gaps, a shaft mounting said flapper armature substantially on its center of gravity for limited rotary movement of its ends within said pole air gaps between said pole shoes, the said flapper armature ends oscillating within said air gaps in response to a source of A.C. current energizing said spaced coil means, said armature oscillation being at the same frequency as the frequency of the A.C. current in said spaced coils and independently of external vibrations and accelerations, a movable contact fixedly secured on said armature shaft remote from said flapper armature, stationary contacts equally and oppositely spaced relative to the mid-centered position of said movable contact, said stationary contacts being mounted in the plane of rotary movement of said movable contact, a magnetic flux shielding plate member positioned on said support means intermediate the said plane of said contacts and the area of the magnetic srtucture, the armature shaft extending freely through an aperture in said flux shielding plate member.

7. The structure as defined in claim 6 wherein the said stationary and movable contacts constitute abutment means to limit the rotary movement of said flapper armature whereby its ends are prevented from striking said pole shoes, said flux shielding plate member being spaced from each of the magnetic flux and contact areas a distance greater than the air gap between the pole shoes to prevent the permanent magnet field from being shorted out and also shielding the area of said contacts from stray magnetic fields.

8. An electromechanical chopper comprising, support means, magnet means including pole members mounted in laterally spaced relation on said support means, A.C. energizing coils mounted on said pole members, said pole members each having a pair of equally spaced pole shoes forming pole gaps disposed abreast of each other, a shaft mounted equidistantly between said pole members in a plane parallel therewith, a lightweight flapper armature of low inertia fixed on and extending transversely of said shaft, the ends of said armature being disposed within said pole gaps, bearing means rotatably mounting said shaft whereby said armature is arranged to oscillate within said pole gaps in response to said energizing coils, said armature shaft having a tubular reed contact member extending therethrough at one side of said shaft and spaced from said armature to extend in a direction normal to said armature, a reed-wire secured in and extending from said reed member at said one side of said armature shaft, a stationarily mounted tubular connector mounted on said support means, said reed-wire extending to and secured within said tubular connector for connection to a D.C. current source, stationary contact means mounted on said support means, the oscillation of said armature being limited by engagement with said stationary contact means and thereby maintaining said armature ends out of contact with said pairs of spaced pole shoes.

9. The device as defined in claim 8 wherein said stationary contact means includes means to adjust the position of said stationary contact means.

10. An electromechanical chopper device comprising, a support structure, a magnetic structure mounted on said support structure, said magnetic structure including pole means having pairs of pole shoes mounted on said support structure in transversely spaced relation, permanent bar magnets disposed in bucking relation between said transversely spaced pairs of pole shoes, coil means operatively mounted relative to said pole means and adapted to be energized from an A.C. current source, an armature shaft having an armature fixed thereon, means mounting said armature shaft to freely oscillate said armature through a predetermined arc between the said pairs of pole shoes of said pole means, contact means carried by said armature shaft adapted to be energized by a D.C. current source, stationary contacts contactable by said armature-shaft-carried contact means at the ends of the arcuate movement of said armature, whereby a chopped D.C. current having a chopped frequency having the same frequency of the A.C. current in said coil means is obtained, a shielding plate means mounted transversely of said support structure and located between the areas of the contact means and pole means, a header means spaced from and secured on one side of said shielding plate means, a hood disposed in surrounding relation to said magnets and rigidly secured to said shielding plate means and spaced from said header means, a flux shielding means surrounding said hood and rigidly secured to said shielding plate means, and an outer casing enclosing said hood and both said shielding means and arranged for hermetic sealing engagement with said header means.

11. A device as recited in claim 10 wherein terminal means adapted for the A.C. energization of said coils are hermetically mounted in the end of said outer casing remote from said header means, and terminal means mounted on said header means for said D.C. current contacts.

References Cited in the file of this patent

UNITED STATES PATENTS

| | | |
|---|---|---|
| 1,913,826 | Blosser | June 13, 1933 |
| 2,473,939 | Clark | June 21, 1949 |
| 2,884,498 | Fisher | Apr. 28, 1959 |
| 2,890,399 | Dyne | June 9, 1959 |
| 2,928,915 | Vigren | Mar. 15, 1960 |

FOREIGN PATENTS

| | | |
|---|---|---|
| 252,325 | Great Britain | May 23, 1927 |